United States Patent
Liu

(10) Patent No.: US 8,144,601 B2
(45) Date of Patent: Mar. 27, 2012

(54) FAULT DETECTION METHOD, COMMUNICATION SYSTEM AND LABEL SWITCHING ROUTER

(75) Inventor: Guangtao Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 12/493,472

(22) Filed: Jun. 29, 2009

(65) Prior Publication Data

US 2009/0262651 A1 Oct. 22, 2009

Related U.S. Application Data

(63) Continuation of application No. PCT/CN2008/001041, filed on May 28, 2008.

(30) Foreign Application Priority Data

May 30, 2007 (CN) .......................... 2007 1 0105810

(51) Int. Cl.
*G01R 31/08* (2006.01)
(52) U.S. Cl. .................. 370/241.1; 370/244; 370/395.5; 370/473; 709/224
(58) Field of Classification Search ........................ None
See application file for complete search history.

(56) References Cited

U.S. PATENT DOCUMENTS

| | | | | |
|---|---|---|---|---|
| 6,501,756 B1 * | 12/2002 | Katsube et al. | ............... | 370/392 |
| 7,164,652 B2 * | 1/2007 | Puppa et al. | .................. | 370/225 |
| 2002/0112072 A1 * | 8/2002 | Jain | ............................... | 709/239 |
| 2002/0176370 A1 | 11/2002 | Ohba et al. | | |
| 2002/0176371 A1 * | 11/2002 | Behzadi | ........................ | 370/392 |
| 2005/0141504 A1 * | 6/2005 | Rembert et al. | .............. | 370/392 |
| 2006/0268682 A1 * | 11/2006 | Vasseur | ......................... | 370/242 |
| 2007/0165515 A1 * | 7/2007 | Vasseur | ......................... | 370/216 |
| 2007/0180104 A1 * | 8/2007 | Filsfils et al. | ................. | 709/224 |

(Continued)

FOREIGN PATENT DOCUMENTS

CN 1618025 A 5/2005

(Continued)

OTHER PUBLICATIONS

Aggarwal et al., "OAM Mechanisms in MPLS Layer 2 Transport Networks", Oct. 2004, IEEE Communications Magazine, pp. 124-130.*

(Continued)

*Primary Examiner* — Jeffrey M Rutkowski
(74) *Attorney, Agent, or Firm* — Leydig, Voit & Mayer, Ltd.

(57) ABSTRACT

A fault detection method, a communication system, and an LSR are provided herein to overcome the inability of performing BFD packet resolution fault detection for multiple nodes in the conventional art. The method includes: determining a hop count between a first node and a second node on an LSP, where the second node is located downstream of the first node; encapsulating a BFD packet into an MPLS packet that carries information about the hop count between the first node and the second node; sending the MPLS packet from the first node along the active LSP; and judging, by the node that receives the MPLS packet, whether this node is the second node according to the hop count. If this node is the second node, extract the BFD packet for detect, and obtaining a fault detection result. Otherwise, forward the MPLS packet. Through the technical solution provided by the invention, the fault detection is more flexible in the MPLS.

14 Claims, 3 Drawing Sheets

U.S. PATENT DOCUMENTS

| | | | |
|---|---|---|---|
| 2008/0037436 A1 | 2/2008 | Liu | |
| 2008/0080507 A1* | 4/2008 | Swallow et al. | 370/392 |
| 2009/0225652 A1* | 9/2009 | Vasseur et al. | 370/225 |
| 2010/0290345 A1* | 11/2010 | Gero et al. | 370/241.1 |

FOREIGN PATENT DOCUMENTS

| | | |
|---|---|---|
| CN | 1761228 A | 4/2006 |
| CN | 1829191 A | 9/2006 |
| CN | 1838620 A | 9/2006 |
| CN | 1901468 A | 1/2007 |
| WO | WO 2007016841 A1 | 2/2007 |

OTHER PUBLICATIONS

Aggarwal et al., "BFD for MPLS LSPs," *IETF Network Working Group (Draft)*, 1-13 (Jun. 20, 2008) http://draft-ietf-bfd-mpls-07.txt.

Pan et al., "Fast Reroute Extensions to RSVP-TE for LSP Tunnels," *IETF Network Working Group RFC 4090*, 1-38 (May 2005).

Katz, D., et al., "RFC 5883—Bidirectional Forwarding Detection (BFD) for Multihop Paths," Jun. 2010, Internet Engineering Task Force, Fremont California.

Katz, D., et al., "Bidirectional Forwarding Detection—Internet Draft," Mar. 2005, The Internet Society, Reston, VA.

Katz, D., et al., "BFD for IPv4 and IPv6 (Single Hop)—Internet Draft," Mar. 2005, The Internet Society, Reston, VA.

Awduche, D., et al., "RSVP-TE: Extensions to RSVP for LSP Tunnels," Dec. 2001, The Internet Society, Reston, VA.

Office action from the Chinese Patent Office in corresponding Chinese Patent Application No. 2007101058103 (Jan. 29, 2010).

Written Opinion from the International Searching Authority in corresponding PCT Application No. PCT/CN2008/001041 (Aug. 27, 2008).

Yu, The Realization of OAM and Fault Detection in MPLS Network, *Telecommunication World*, 6(126): 88-89 (Jun. 30, 2005).

\* cited by examiner

FAULT DETECTION METHOD, COMMUNICATION SYSTEM AND LABEL SWITCHING ROUTER

CROSS-REFERENCE TO RELATED APPLICATIONS

This application is a continuation of International Patent Application No. PCT/CN2008/001041, filed May 28, 2008, which claims priority to Chinese Patent Application No. 200710105810.3, filed May 30, 2007, both of which are hereby incorporated by reference in their entirety.

FIELD OF THE INVENTION

The present invention relates to the route switching technology in the network communication field, and in particular, to a fault detection method, a communication system, and a Label Switching Router (LSR).

BACKGROUND

The statements in this section merely provide background information related to the present invention and do not constitute prior art.

The Multi-Protocol Label Switching Traffic Engineering (MPLS TE) Fast ReRouting (FRR) is one of the technologies for implementing local protection of a network. In a network where the MPLS TE is applied, the Label Switching Path (LSP) configured with FRR protection can switch data onto the protection link automatically when link failure or node failure occurs. The MPLS FRR is characterized by fast response and timely switching, which ensure smooth transition of the service data without service interruption. Meanwhile, the source node of the LSP attempts to find a new path to create an LSP again, and switches the data onto the new path. The service data keeps being forwarded through the protection path before the new LSP is created successfully.

The MPLS TE FRR is based on the Resource ReSerVation Protocol (RSVP) TE. The FRR is implemented in two modes: one-to-one backup mode, and facility backup mode. In the facility backup mode, one protection path is used to protect multiple LSPs, and this protection path is called a bypass LSP. As shown in FIG. 1, RTA-RTE are nodes, the solid line represents an active LSP, and the dotted line represents a bypass LSP. When the RTB-RTC link or the RTC node fails, the data on the active LSP is switched onto the bypass LSP, and this process is FRR. The packet header sent from the RTB uses the label allocated by the RTF to the RTB, and the egress label of the RTC is also crimped into the label stack. On the RTB-RTF-RTD path, the LSP uses a double-layer label. After the RTD receives a packet and the label allocated by the RTD to the RTF pops up, the packet is forwarded through the label allocated by the RTD to the RTC. The facility backup mode is also known as a bypass mode.

Network devices are expected to have a more and more important feature of fast detection for the communication faults between adjacent systems. With such a feature, the network device can create a substitute path or switch the service onto other links more quickly after a fault occurs. The Bidirectional Forwarding Detection (BFD) can perform fault detection on many types of paths between the systems. Such paths include direct physical links, virtual circuits, tunnels, MPLS LSPs, multi-hop routing paths, and indirect paths. By virtue of the simplicity and singularity of BFD fault detection, the BFD is dedicated to fast detection of faults, and assists the network in transmitting the voice service, video service and other Video On Demand (VOD) services with a high Quality of Service (QoS). Therefore, the BFD assists the service provider in implementing the IP-based networks, and providing the highly reliable and adaptable Voice over IP (VoIP) service and other real-time services for customers.

Currently, in a network where the MPLS TE is applied, the mechanisms of fault detection include link interruption fault detection and BFD packet resolution fault detection.

The link interruption fault detection is: a detection is made about whether each LSR in the network receives any packet within a preset time. Because the BFD packets are sent periodically, the preset time may be determined according to the sending period of the BFD packets. If any packet is received within the preset time, no processing is required. If no packet is received within the preset time, a notification is sent to the source node through a standby path to indicate that the active LSP fails.

The BFD packet resolution fault detection is: after receiving an MPLS packet that carries a BFD packet, each LSR resolves out the BFD packet and detects it to check for any fault of nodes or links between the node that sends the MPLS packet and the local node. However, after receiving the MPLS packet that carries a BFD packet, the LSR resolves the packet directly and performs subsequent processing. Therefore, one node may detect only the current adjacent downstream node and the link between the two nodes. For example, in a ring topology shown in FIG. 2, node A can detect only the current downstream node (node B) and the link between node A and node B. Apparently, the BFD packet resolution fault detection in the conventional art lacks flexibility of practice. Moreover, it is assumed that an active LSP is created in the ring topology shown in FIG. 2, node A is an ingress (source node), the direction is A->B->K->C->J, and a bypass tunnel "A->F->E->D->C->K->B" is created to protect the link in the A->B direction on the active LSP (thus forming link protection). After the link in the A->B direction on the active LSP fails, node A at the Point of Local Repair (PLR), namely, at the head LSR of the standby tunnel, performs FRR switching. After switching, the traffic path is A->F->E->D->C->K->B->K->C->J, thus performing FRR protection. The foregoing FRR process reveals that after switching, one segment of the traffic path is C->K->B->K->C. Therefore, the user traffic is dual traffic on the B-K-C link. That is, the traffic direction is C->K->B->K->C which occupies double of the bandwidth required by the user traffic, thus wasting the link bandwidth drastically and wasting some time.

SUMMARY

A fault detection method, a communication system, and an LSR are provided in various embodiments of the present invention to overcome the inability of performing BFD packet resolution fault detection for multiple nodes in the conventional art.

For such a purpose, a fault detection method is provided in an embodiment of the present invention. The method includes: (1) receiving an MPLS packet that carries an encapsulated BFD packet and information about a hop count from a source node to a target node; and (2) judging whether the current node is the target node of the MPLS packet. If the current node is the target node of the MPLS packet, extract the BFD packet in the MPLS packet. Otherwise, forward the MPLS packet.

A method for sending a fault packet is provided in an embodiment of the present invention. The method includes: (1) determining a hop count between a first node and a second node on an LSP, where the second node is located downstream of the first node; (2) encapsulating a BFD packet into an MPLS packet that carries information about the hop count between the first node and the second node; and (3) sending the MPLS packet along the LSP.

A communication system is provided in an embodiment of the present invention. The communication system includes at least a first node and a second node on the LSP, where the second node is located downstream of the first node.

The first node is adapted to: determine a hop count between the first node and the second node; encapsulate the BFD packet into an MPLS packet that carries information about the hop count; and send the MPLS packet along an active LSP.

The node that receives the MPLS packet is adapted to judge whether this node is the second node according to the hop count after receiving the MPLS packet. If this node is the second node, extract the BFD packet for detecting, and obtain a fault detection result. Otherwise, forward the MPLS packet.

An LSR is provided in an embodiment of the present invention. The LSR is located on an LSP, and includes: (1) a sending module, adapted to send information; (2) a hop count obtaining module, adapted to determine and output a hop count between the LSR and a second node, where the second node is located on the LSP downstream of the LSR; and (3) a processing module, adapted to encapsulate a BFD packet into an MPLS packet that carries the hop count, and instruct the sending module to send the MPLS packet along the LSP.

An LSR is provided in an embodiment of the present invention. The LSR includes: (1) a receiving module, adapted to receive information; and (2) a judging and processing module, adapted to judge whether the local node needs to extract the BFD packet according to the information about the hop count in the MPLS packet after the receiving module receives the MPLS packet that carries the BFD packet. If the local node needs to extract the BFD packet, extract the BFD packet for detecting, and obtain a fault detection result. Otherwise, forward the MPLS packet.

Through the technical solution under the present invention, the MPLS packet carries the information about the hop count between the first node (source node) and the second node (target node), and the node that receives the MPLS packet judges whether this node is the second node (target node) according to the hop count and then performs operations according to the judgment result rather than resolves the MPLS packet that carries the BFD packet directly. Therefore, BFD packet resolution fault detection can be performed for multiple nodes to check whether any fault occurs on the multiple nodes and the link between the nodes, thus making the fault detection more flexible in the MPLS.

BRIEF DESCRIPTION OF THE DRAWINGS

The invention will become more fully understood from the detailed description given herein below by referring to the accompanying drawings among which.

DETAILED DESCRIPTION

The following description is merely exemplary in nature and is not intended to limit the present invention, application, or uses.

In an embodiment of the present invention, improvement is made on the BFD packet resolution fault detection in a network where MPLS TE is applied. The improved BFD packet resolution fault detection includes: (1) determining hop count between a first node (source node) and a second node (target node) on the active LSP, where the second node is located downstream of the first node; (2) encapsulating a BFD packet into an MPLS packet that carries information about the hop count between the first node and the second node; (3) sending the MPLS packet from the first node along the active LSP; and (4) judging, by the node that receives the MPLS packet, whether this node is the second node according to the hop count. If this node is the second node, extract the BFD packet for detecting and obtain a fault detection result. Otherwise, forwarding the MPLS packet.

The embodiments of the present invention are detailed below by reference to accompanying drawings.

Figure 3:
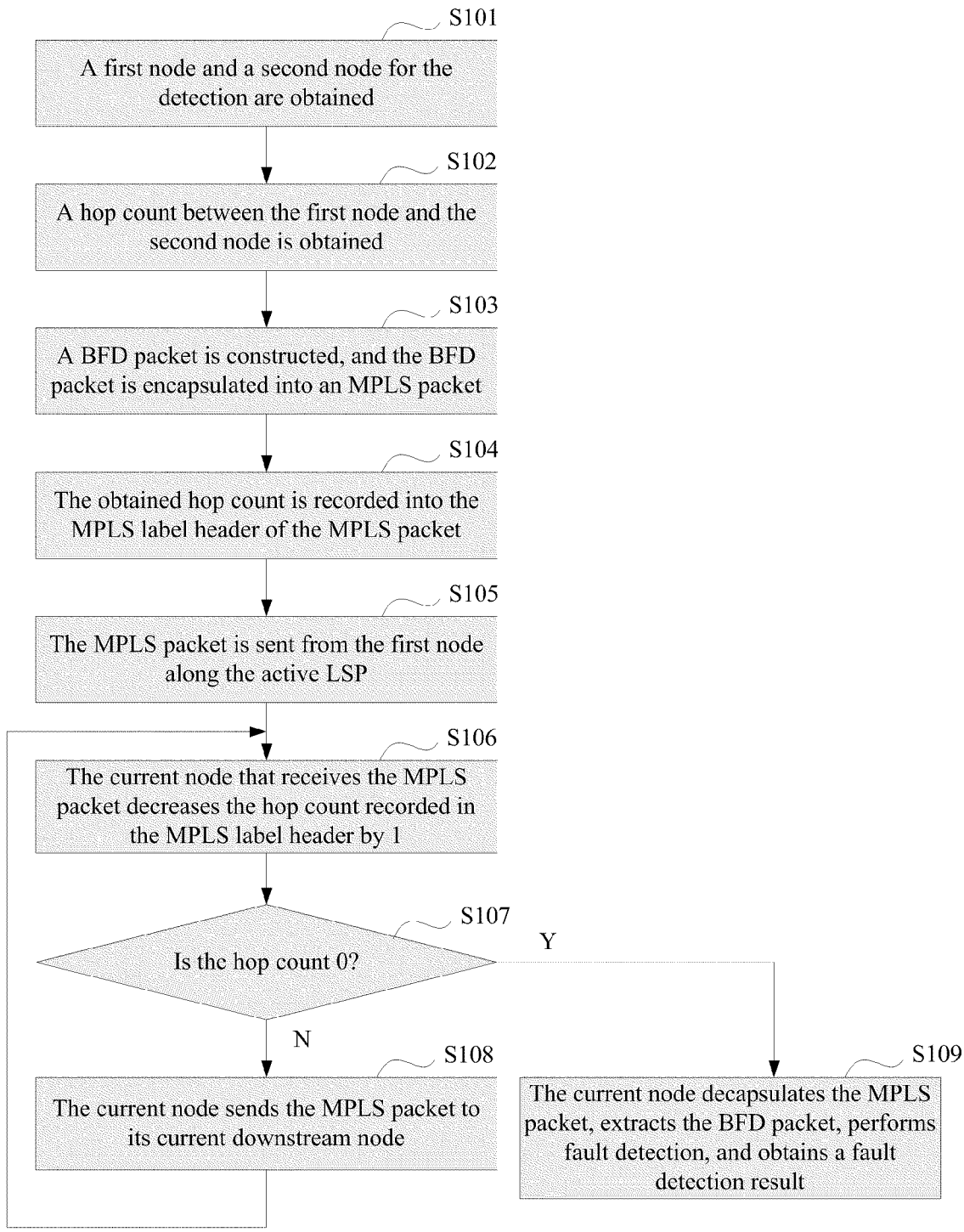
FIG. 3 is a flowchart of fault detection in an embodiment of the present invention.

As shown in FIG. 3, the process of fault detection in an embodiment of the present invention includes the following steps.

Step S101: A first node and a second node for the detection are obtained.

The first node may be any node other than the egress (target node) on an active LSP; and the second node is located on the active LSP downstream of the first node. The first node and the second node may be specified as required.

Step S102: A hop count between the first node and the second node is obtained.

The hop count may be one or more hops. When the hop count is not less than 2, the fault detection is regarded as fault detection for multiple nodes.

When creating an active LSP, an LSR may exchange signaling with other LSRs to obtain the addresses of other LSRs on the link. Therefore, after the locations of the first node and the second node are determined, the addresses obtained by the first node include the addresses of the downstream nodes of the first node. The RSVP-TE may calculate out the hop count required from the first node to the second node according to the corresponding address.

Step S103: A BFD packet is constructed, and the BFD packet is encapsulated into an MPLS packet.

The method for constructing the BFD packet at the first node may be the same as the BFD detection mechanism defined by the Internet Engineering Task Force (IETF).

At the time of encapsulating the BFD packet into an MPLS packet, it is necessary to obtain the egress label of the active LSP at the first node, namely, the path that ought to be selected at the first node is the active LSP, and encapsulate the BFD packet into an MPLS packet, namely, affix an MPLS packet header to the BFD packet.

In practice, S102 may be performed before, during or after S103.

Step S104: The obtained hop count is recorded into the MPLS label header of the MPLS packet.

In practice, the obtained hop count may be set in the MPLS label header of the MPLS packet as a Time To Live (TTL) value of the encapsulated MPLS packet.

Step S105: The MPLS packet is sent from the first node along the active LSP.

The encapsulated MPLS packet is sent from the first node along the active LSP, namely, the egress label of the encapsulated packet is the egress label of the active LSP at the first node.

Step S106: The current node that receives the MPLS packet decreases the hop count recorded in the MPLS label header by 1.

Step S107: The current node judges whether the hop count is 0. If the hop count is 0, the process proceeds to step S109, or else step S108.

Step S108: The current node sends the MPLS packet to its downstream node, and the process returns to step S106.

Step S109: The current node is determined as the second node. The current node decapsulates the MPLS packet and extracts the BFD packet, performs fault detection by identifying the BFD packet, and obtains a fault detection result.

Extracting the BFD packet for detecting refers to removing the MPLS packet header and obtaining the BFD packet.

In practice, the first node may be specified as the PLR of the active LSP, or as the upstream node of the PLR. If the fault detection result obtained in this step indicates that a fault exists, the second node sends a fault notification to the first node. The first node performs FRR switching according to the fault notification, and switches the forwarding path to the protection LSP.

It is thus evident that in this process, the process of judging whether the local node is the second node according to the hop count between the first node and the second node includes: decreasing the hop count recorded in the MPLS label header by 1; and judging whether the current hop count is 0. If the current hop count is 0, determining the local node to be the second node. Otherwise, determining the local node not to be the second node.

In the embodiment of the present invention, improvements are made for the BFD packet resolution fault detection in a network where MPLS TE is applied. When the embodiment of the present invention is applied, the link interruption fault detection may be applied concurrently. The method of link interruption fault detection includes: a detection is made about whether each LSR in the network receives any packet within a preset time. Because the BFD packets are sent periodically, the preset time may be determined according to the sending period of the BFD packets. If any packet is received within the preset time, no processing is required. If no packet is received within the preset time, it is deemed that the packet transmission fails due to link interruption, and a notification is sent to the source node or the first node through a standby path to indicate that the active LSP fails. After the first node receives the fault notification, no matter whether the fault notification is a fault result of the BFD packet resolution fault detection or a fault result of the link interruption fault detection, the FRR switching may be performed according to the fault notification so that the forwarding path is switched to the protection LSP.

It is thus evident that through the technical solution provided in this embodiment, fault detection may be performed for multiple nodes, thus making the BDF detection more flexible in the MPLS. Moreover, the fault detection for multiple nodes may also solve the problem that the overlap of two ring topologies undertakes double traffic.

Figure 1:
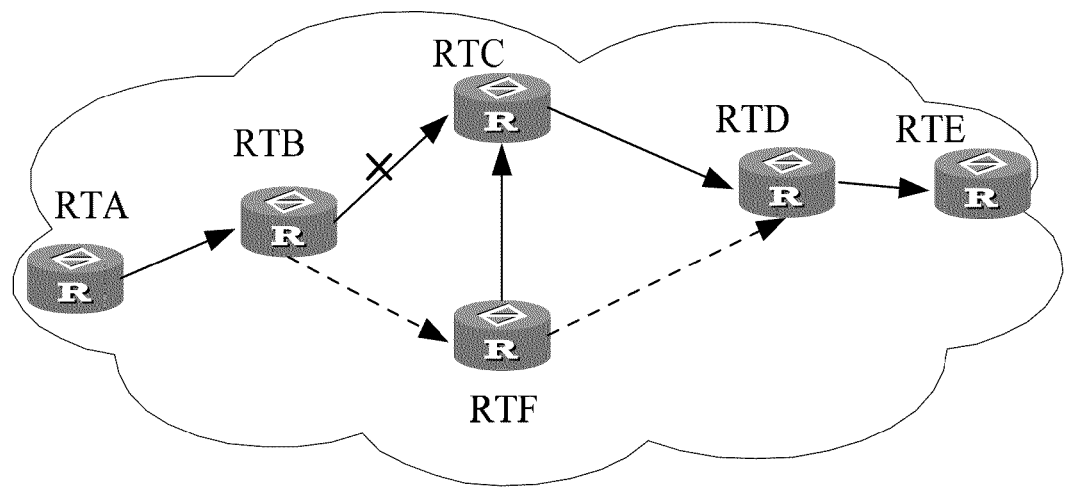
FIG. 1 shows a topology structure in the facility backup mode in the conventional art.
Figure 2:
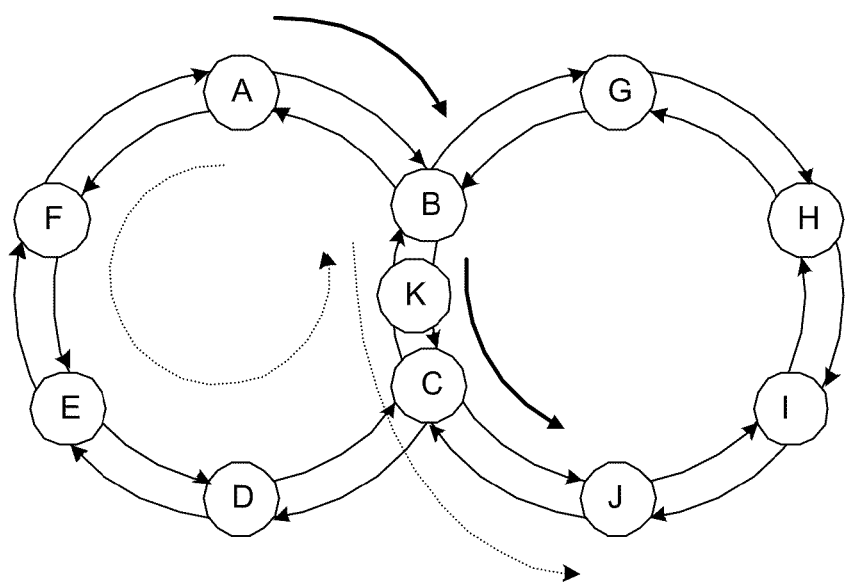
FIG. 2 shows two ring topologies.

Still taking the two ring topologies shown in FIG. 2 as an example, in an instance of this embodiment, the first node that performs fault detection for multiple nodes is specified as node A, and the second node is node C. In this instance, node C is a Merge Point (MP) node, namely, the end node along the active LSP direction in the overlap of the two ring topologies. The instance shown in FIG. 2 is two ring topologies, and may be two or more ring topologies in practice. If the hop count from the first node to the second node is 3, the detection process is: A BFD packet is constructed at node A, and encapsulated into an MPLS packet. The MPLS packet is sent from node A along the active LSP direction, namely, A->B-> K->C->J. After traveling for three hops, the MPLS packet is decapsulated at node C, and the BFD packet is extracted out of the MPLS packet for detecting. If the link from A to C or any node on the link is detected as faulty, node A is notified through other paths. Node A performs FRR switching according to the notification.

In the foregoing detection process, the fault detection is performed for multiple nodes. Once the link from A to C or any node on the link is faulty, node A performs FRR switching. Therefore, the bypass tunnel to be created is A->F-> E->D->C->J. Therefore, after the FRR switching is performed at node A, the forwarding path after switching is A->F->E->D->C->J. Evidently, in this case, the overlap of the two ring topologies does not need to undertake double traffic, thus saving the bandwidth resources in the overlap.

However, in order to save the bandwidth resources in the overlap, even if the specified second node is not node C, the forwarding path after switching may also be configured as A->F->E->D->C->J. For example, in the two ring topologies shown in FIG. 2, if the first node is specified as node A and the second node is specified as node K, once any fault is detected, it is evident that the active LSP is unavailable and the FRR switching is required. Therefore, after detecting the fault, node K notifies node A. After node A performs FRR switching, the forwarding path is A->F->E->D->C->J. In this way, the overlap of the two ring topologies does not need to undertake double traffic, thus saving the bandwidth resources of the overlap.

It is thus evident that in this embodiment, when the egress node is not attributable to the overlap of multiple ring topologies, the overlap of the multiple ring topologies does not need to undertake double traffic by configuring the bypass LSP to bypass the link of the overlap. When the egress node is attributable to the overlap of multiple ring topologies, for example, when the egress node in the two ring topologies shown in FIG. 2 is node K, the forwarding path is A->F->E->D->C->K after FRR switching. Therefore, the overlap of the two ring topologies does not need to undertake double traffic either.

A communication system provided in an embodiment of the present invention includes at least a first node and a second node on the active LSP, where the second node is located downstream of the first node.

The first node is adapted to: determine a hop count between the first node and the second node; encapsulate the BFD packet into an MPLS packet that carries information about the hop count; and send the MPLS packet along an active LSP.

The node that receives the MPLS packet is adapted to judge whether this node is the second node according to the hop count after receiving the MPLS packet. If this node is the second node, extract the BFD packet for detecting, and obtain a fault detection result. Otherwise, forward the MPLS packet.

In the foregoing communication system, the second node is also adapted to send a fault notification if the foregoing fault detection result indicates that a fault exists.

The first node is the PLR of the active LSP or an upstream node of the PLR, and is also adapted to perform FRR switching according to the fault notification, and switch the forwarding path to the protection LSP.

The nodes in the communication system may be LSR.

The specific functions of the nodes mentioned above are described in the method embodiment of the present invention.

Figure 4:
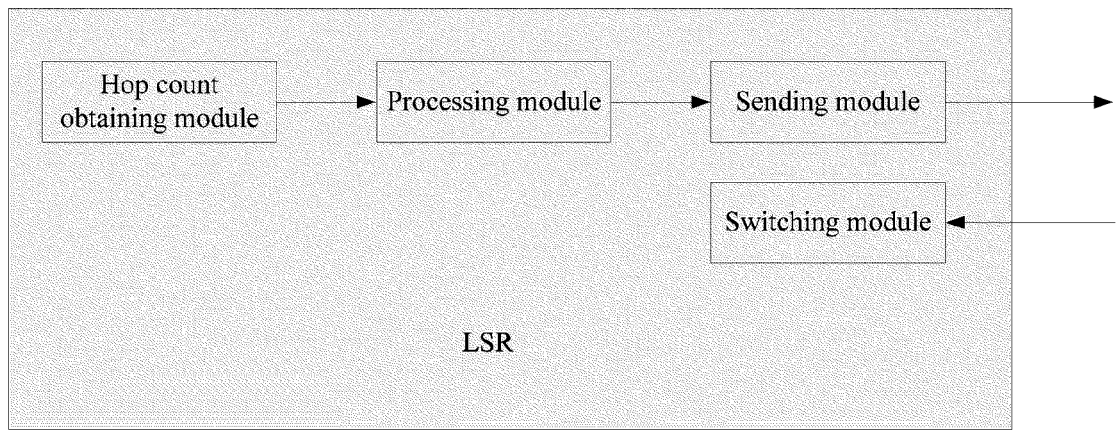
FIG. 4 shows an LSR in an embodiment of the present invention.

An LSR in an embodiment of the present invention is located on the active LSP. As shown in FIG. 4, the LSR includes: (1) a sending module, adapted to send information; (2) a hop count obtaining module, adapted to determine and output a hop count between the LSR and a second node, where the second node is located on the active LSP downstream of the LSR; and (3) a processing module, adapted to encapsulate a BFD packet into an MPLS packet that carries the hop count, and instruct the sending module to send the MPLS packet along the active LSP.

The LSR may also include a switching module, adapted to perform FRR switching after receiving a fault notification, and switch the forwarding path to the protection LSP.

Figure 5:
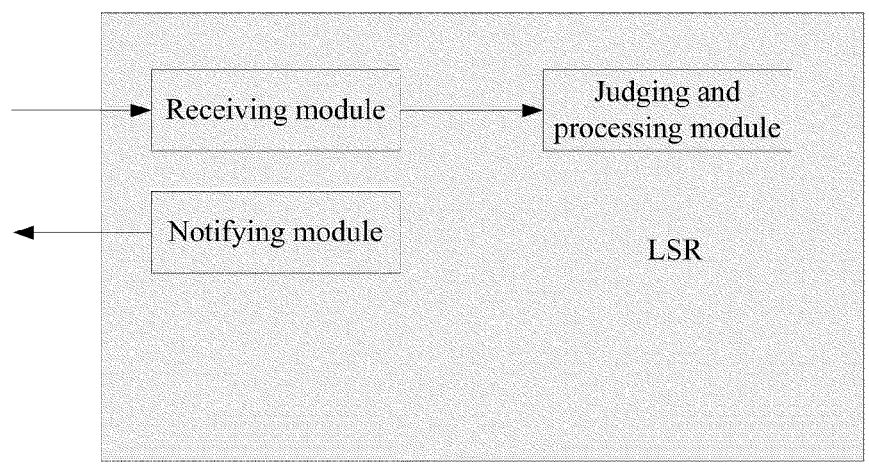
FIG. 5 shows an LSR in another embodiment of the present invention.

As shown in FIG. 5, an LSR in another embodiment of the present invention includes: (1) a receiving module, adapted to receive information; and (2) a judging and processing module, adapted to judge whether the local node needs to extract the BFD packet according to the information about the hop count in the MPLS packet after the receiving module receives the MPLS packet that carries the BFD packet. If the local node needs to extract the BFD packet, extract the BFD packet for detecting, and obtain a fault detection result. Otherwise, forward the MPLS packet.

The LSR may also include a notifying module, adapted to instruct the sending module to send a fault notification if the fault detection result indicates that a fault exists.

To sum up, through the technical solution provided in an embodiment of the present invention, fault detection can be performed for multiple nodes simply and efficiently, thus making the fault detection more flexible. Moreover, when a bypass tunnel is created, the overlap of multiple ring topologies does not need to undertake double traffic, thus saving the bandwidth resources in the overlap.

It is apparent that those skilled in the art can make various modifications and variations to the present invention without departing from its spirit and scope. The invention is intended to include such modifications and variations provided that they fall within the scope of protection defined by the following claims or their equivalents.

What is claimed is:

1. A fault detection method, comprising:
    determining, by a first node on an active Label Switching Path (LSP), a hop count from the first node to a second node on the active LSP along the LSP based on the Resource Reservation Protocol Traffic Engineering (RSVP-TE) wherein each of the first node and the second node is a node other than an egress node of the LSP, and initial value of the hop count is not less than 2;
    encapsulating, by the first node, a Bidirectional Forwarding Detection (BFD) packet into a Multi-Protocol Label Switching (MPLS) packet that carries information about the hop count;
    sending, by the first node, the MPLS packet from the first node to the second node along the LSP; and
    judging, by each node that has received the MPLS packet along the LSP, whether the node is the second node according to the hop count;
    extracting, by the second node, the BFD packet from the MPLS packet for performing the fault detection if the node that has received the MPLS packet is the second node;
    forwarding, by the node that has received the MPLS packet, the MPLS packet along the LSP if the node is not the second node.

2. The method of claim 1, wherein the determining the hop count comprises:
    obtaining, by the first node, addresses of the downstream nodes of the first node on the LSP including the address of the second node; and
    calculating out, by the first node, the hop count from the first node to the second node according to the corresponding addresses based on the RSVP-TE.

3. The method of claim 1, wherein the hop count is recorded into the MPLS label header of the MPLS packet.

4. The method of claim 3, wherein the hop count is set in the MPLS label header as a Time To Live (TTL) value of the MPLS packet.

5. The method of claim 4, wherein the judging by each node that has received the MPLS packet along the LSP whether the node is the second node according to the hop count further comprises:
    decreasing, by the node that has received the MPLS packet along the LSP, the hop count recorded in the received MPLS packet by one;
    judging, by the node, whether the hop count is zero;
    determining, by the node, that the node is the second node if the hop count is zero; and
    determining, by the node, that the node is not the second node if the hop count is not zero.

6. The method of claim 1, wherein upon the extracting step, the method further comprises:
    performing, by the second node, the fault detection by identifying the BFD packet;
    obtaining, by the second node, a result of the fault detection;
    sending, by the second node, a fault notification to the first node if the result of fault detection is that a fault is detected; and
    performing, by the first node, Fast ReRouting (FRR) switching according to the fault notification sent from the second node.

7. The method of claim 1, wherein before the encapsulating step, the method further comprises: constructing, by the first node, the BFD packet.

8. A communication system, comprising at least one of the following apparatus:
    a first node on an active Label Switching Path (LSP) configured to determine a hop count from the first node to a second node on the active LSP along the LSP based on the Resource Reservation Protocol Traffic Engineering (RSVP-TE), encapsulate a Bidirectional Forwarding Detection (BFD) packet into a Multi-Protocol Label Switching (MPLS) packet that carries information about the hop count, and send the MPLS packet from the first node to the second node along the LSP; and
    a node configured to receive the MPLS packet, judge whether the node is the second node according to the hop count, extract the BFD packet from the MPLS packet for performing a fault detection if the node is the second node, or forward the MPLS packet along the LSP if the node is not the second node;
    wherein each of the first node and the node is not the egress node of the LSP, and initial value of the hop count is not less than 2.

9. The communication system of claim 8, wherein:
    the second node is further configured to perform the fault detection by identifying the BFD packet, obtain a result of the fault detection and send a fault notification to the first node if the fault detection result indicates that a fault exists; and
    the first node is one of a Point of Local Repair (PLR) of the LSP and an upstream node of the PLR, further configured to perform Fast ReRouting (FRR) switching according to the fault notification and switch a forwarding path to a protection LSP.

10. The communication system of claim 8, wherein the first and the second nodes are Label Switching Routers (LSRs).

11. A Label Switching Router (LSR) located on a Label Switching Path (LSP) comprising:
- a sending module, configured to send information;
- a hop count obtaining module, configured to determine and output a hop count from the LSR to a second node on the LSP based on the Resource Reservation Protocol Traffic Engineering (RSVP-TE), wherein each of the LSR and the second node is a node other than an egress node of the LSP, and initial value of the hop count is not less than 2; and
- a processing module, configured to encapsulate a Bidirectional Forwarding Detection (BFD) packet into a Multi-Protocol Label Switching (MPLS) packet that carries the hop count, and instruct the sending module to send the MPLS packet to the second node along the LSP.

12. The LSR of claim 11, further comprising a switching module, configured to receive a fault notification from the second node, perform Fast ReRouting (FRR) and switch a forwarding path to a protection LSP.

13. A Label Switching Router (LSR) located on a Label Switching Path (LSP) comprising:
- means for receiving a Multi-Protocol Label Switching (MPLS) packet from a first node on the LSP, wherein the MPLS packet carries a Bidirectional Forwarding Detection (BFD) packet constructed by the first node and a hop count from the first node to a second node along the LSP, the hop count is determined by the first node based on the Resource Reservation Protocol Traffic Engineering (RSVP-TE), each of the first node and the LSR is a node other than the egress node of the LSP, and initial value of the hop count is not less than 2;
- means for judging whether the LSR is the second node according to the hop count;
- means for extracting the BFD packet from the MPLS packet for performing a fault detection if the LSR is the second node; and
- means for forwarding the MPLS packet along the LSP if the LSR is not the second node.

14. The LSR of claim 13, further comprising:
means for performing the fault detection by identifying the BFD packet;
means for obtaining a result of the fault detection; and
means for sending a fault notification to the first node if the result of fault detection is that a fault is detected.

* * * * *